United States Patent [19]

Ulmer

[11] Patent Number: 4,726,596
[45] Date of Patent: Feb. 23, 1988

[54] SHOPPING CART
[75] Inventor: Harrold J. Ulmer, Sunland, Calif.
[73] Assignee: Whittar Industries, Ltd., Barrington, Ill.
[21] Appl. No.: 903,607
[22] Filed: Sep. 5, 1986
[51] Int. Cl.⁴ ............................................. B62B 39/00
[52] U.S. Cl. ................................. 280/33.99 C; 16/48
[58] Field of Search ................. 280/33.99 R, 33.99 A, 280/33.99 C, 33.99 H, 111, 47.34, 87.01, 87.02 R; 16/47, 48

[56] References Cited

U.S. PATENT DOCUMENTS

| | | | |
|---|---|---|---|
| 785,601 | 3/1905 | Fischer | 16/48 |
| 2,903,273 | 9/1959 | Hennion | 280/33.99 C |
| 3,262,715 | 7/1966 | Abbot | 280/111 |
| 3,879,053 | 4/1975 | Chuala | 280/111 |

FOREIGN PATENT DOCUMENTS 698175  9/1953  United Kingdom ................ 280/111

Primary Examiner—John J. Love
Assistant Examiner—Richard Camby
Attorney, Agent, or Firm—Edward J. DaRin

[57] ABSTRACT

An improved shopping cart having a pivoted platform mounting a pair of spaced caster assemblies. The platform has a pivot to permit each caster assembly to pivot independent of the other assembly to substantially continuously engage a supporting surface to thereby avoid the "three-wheel" cart problems.

6 Claims, 5 Drawing Figures

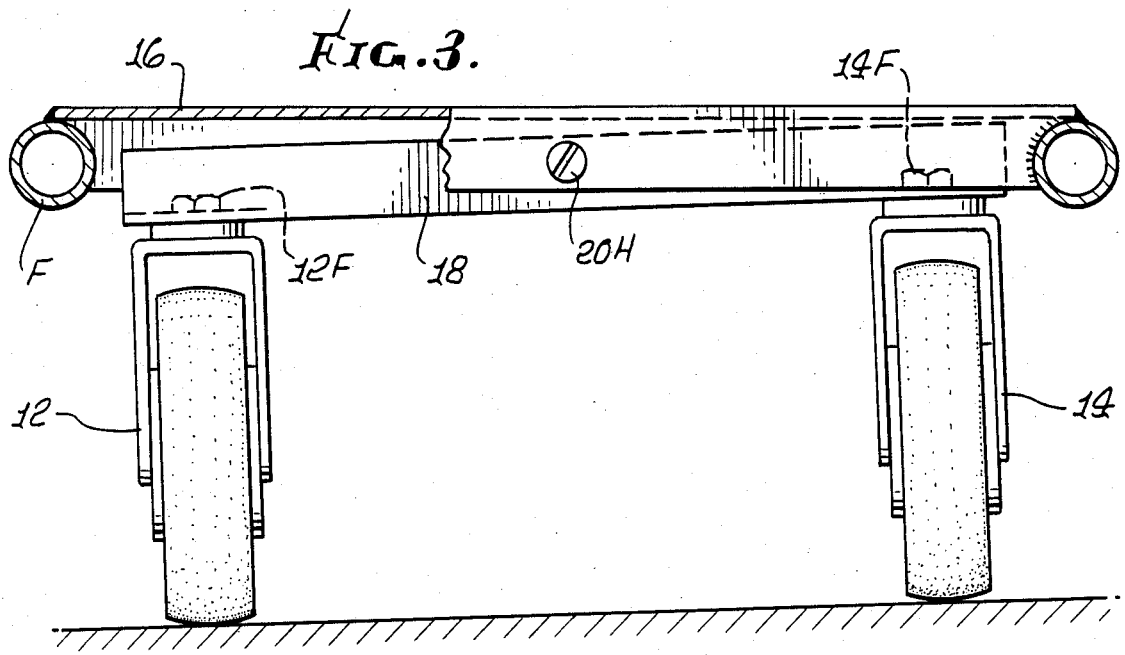
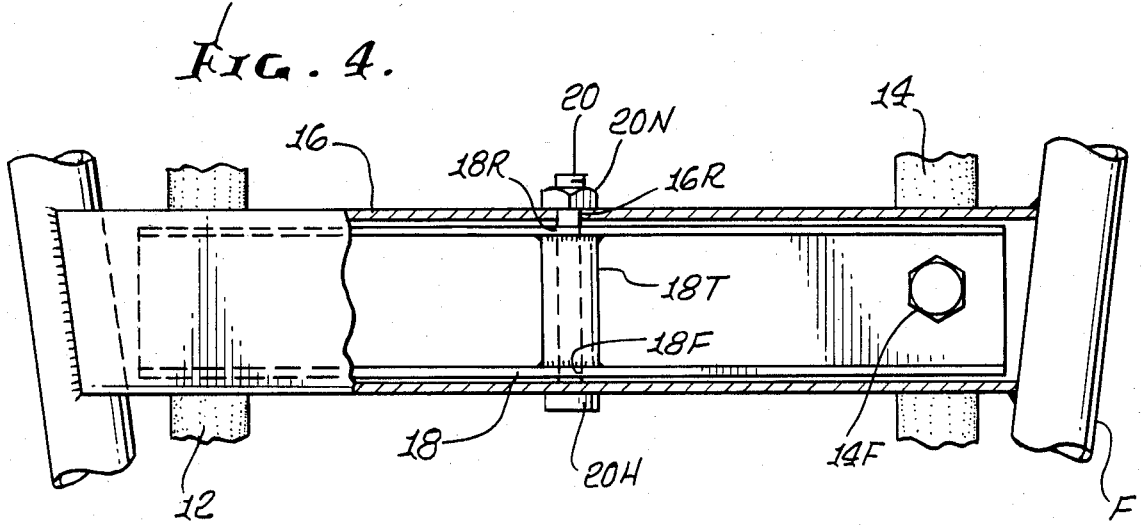
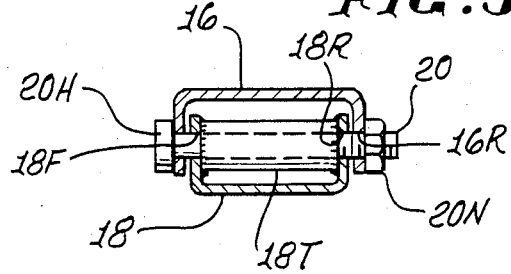

SHOPPING CART

FIELD OF INVENTION

This invention relates to improvements in shopping carts.

BACKGROUND OF INVENTION

Shopping carts are conventionally constructed to be wheeled around stores such as supermarkets, drug stores, hardware stores, or the like, as the customer accumulates and stores the goods he desires to purchase in the basket for the shopping cart. In the construction of shopping carts pairs of spaced caster assemblies are conventionally utilized at each end of the cart frame. During the assembly of the caster assemblies to the shopping cart's frame, if one of the caster assemblies is not properly assembled to the frame from the standpoint of the vertical alignment with the other caster assemblies on the frames relative to a supporting surface, all four wheels will not be in engagement with the supporting surface for the cart at the same time. This misalignment generally occurs with respect to the two caster assemblies at the front end of the cart so that the cart will only have "three wheels" in continuous engagement with the supporting surface. In the event a shopper attempts to push such a "three-wheeled" cart forward, it becomes difficult to push forward, use and control due to such misalignment. These "three-wheel" shopping carts may then be abandoned by the shopper in favor of a "four-wheel" cart. Accordingly, there is a present need for shopping carts that are properly designed and assembled to eliminate the problem of a "three-wheel" shopping cart.

SUMMARY OF INVENTION

The present invention provides an improved and economical shopping cart that is simple and effectively eliminates the "three-wheeled " cart problem of prior art shopping carts. This is accomplished by the provision of a platform for mounting and securing the front caster assemblies for the shopping cart in a pivotable relationship so that the front casters are always in engagement with the supporting surface due to the pivoting of one caster assembly with respect to the other, including when assembled improperly and pushing a cart over an irregular surface.

From a structural standpoint the present invention comprises a shopping cart having a frame and an upwardly opening basket secured to the frame. Individual caster assemblies are secured to the frame adjacent the rear corners thereof for supporting the rear end of the frame on a supporting assembly, and platform means are secured adjacent the front end of the frame. A pair of caster assemblies are secured to the platform means in a spaced apart relationship for supporting the front end of the frame on a supporting surface. The platform means is advantageously constructed and defined for permitting each of the front caster assemblies to pivot relative to the other front caster assemblies to thereby cause both front caster assemblies to substantially continuously engage a supporting surface.

BRIEF DESCRIPTION OF THE DRAWINGS

These and other features of the present invention may be more fully appreciated when considered in the light of the following specification and drawings, in which:

FIG. 3 is a view similar to FIG. 2, with portions broken away, illustrating a pivoted relationship of the front end caster assemblies to allow both wheels to engage a supporting surface;

FIG. 4 is a sectional view, with portions broken away, taken along the line 4—4 of FIG. 2; and FIG. 5 is a sectional view taken along the line 5—5 of FIG. 2, illustrating the pivot for the platform means of the present invention.

DETAILED DESCRIPTION OF THE PREFERRED EMBODIMENT

Figure 1:
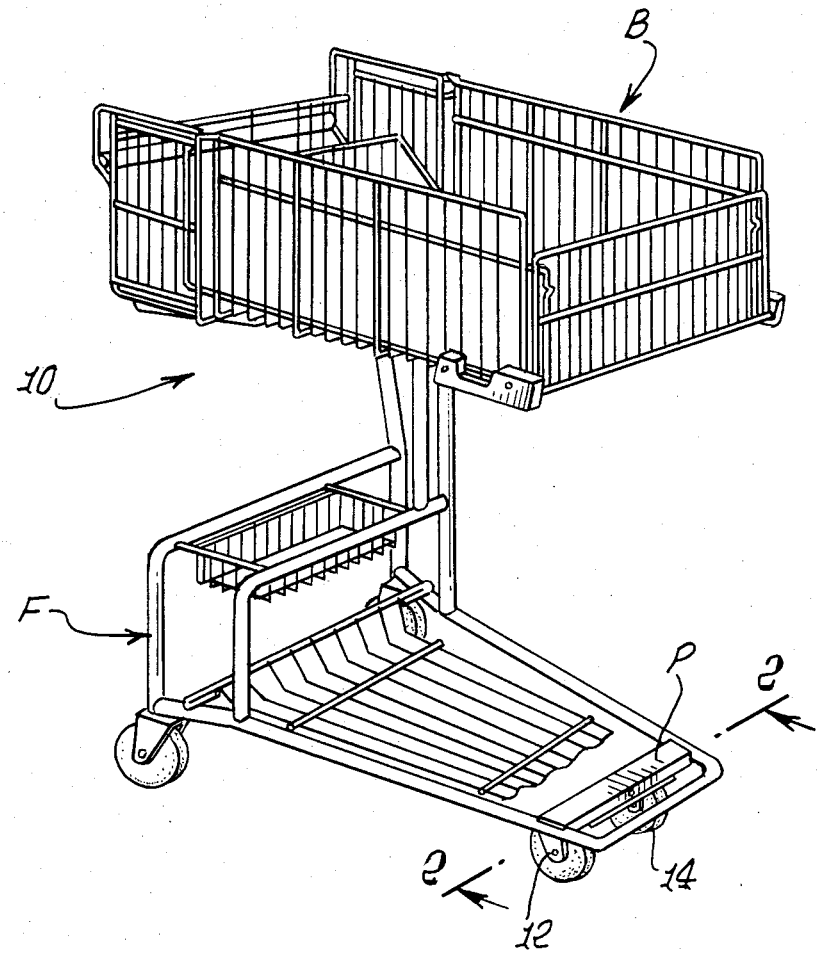
FIG. 1 is a right front perspective of a shopping cart embodying the present invention.

Now referring to the drawings, the improved shopping cart 10 will be described in detail. The invention will be described as it may be embodied in an over-the-counter type of shopping cart, merely to facilitate the description of the invention. A typical over-the-counter shopping cart is disclosed in U.S. Pat. No. 4,560,180, and reference may be had to this patent for details thereof. It should be recognized, however, that the present invention is applicable to any type of present day shopping cart. The significant aspect of the invention is the means for mounting the pair of front end caster assemblies of the shopping cart in pivotable relationship to one another to eliminate the "three-wheel" problem of prior art shopping carts.

The shopping cart 10 of the present invention basically comprises a frame F constructed and defined to support an upwardly opening basket B for receiving the goods that the shopper selects and stores in the basket. The frame is conventionally supported by four caster assemblies, one adjacent each corner of the frame F, as illustrated in FIG. 1. The caster assemblies per se are of conventional construction. For the purposes of the present invention the pair of spaced caster assemblies 12 and 14 mounted adjacent the front end of the frame F are mounted to a platform means P secured to the frame F for permitting the caster assemblies 12 and 14 to pivot with respect to one another and thereby be continuously engageable with a supporting surface so as to eliminate the "three-wheel" problem.

Figure 2:
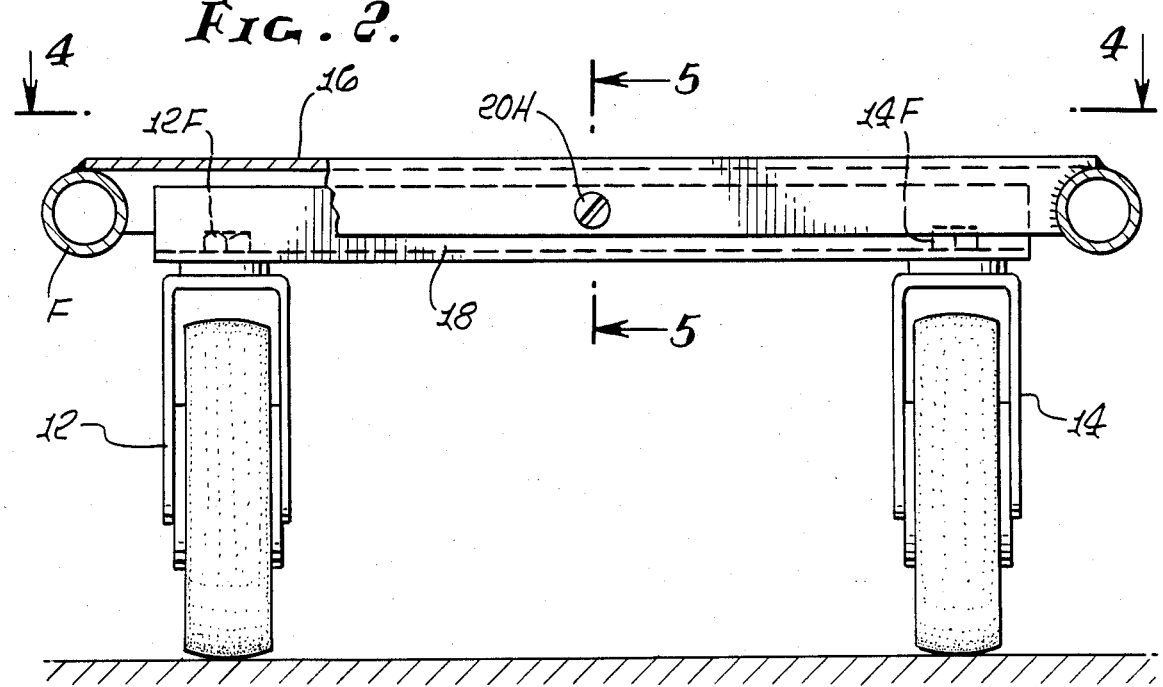
FIG. 2 is a sectional view, with parts broken away, taken along the line 2—2 of FIG. 1, illustrating the platform means for the front end caster assemblies of FIG. 1 in a vertically aligned relationship with a supporting surface.

The platform means P comprises a top plate means 16 in the form of a U-shaped member and a bottom plate means 18 in the form of a U-shaped member. The top plate means 16 is oriented with the open end of the plate facing downwardly and secured to the frame F adjacent its ends by welding or the like, as illustrated in FIG. 2. The top plate means 16 is provided with a pair of apertures 16F and 16R arranged substantially centrally of the plate means in each of the arms of the U-shaped plate. The aperture 16F is illustrated in the front arm of the U-shaped element 16 while the rear aperture is identified as the aperture 16R; see FIG. 4. The apertures 16F and 16R are defined to receive a pivot pin 20 for the platform means P. The bottom plate means 18 for the platform means P is also constructed in the form of a U-shaped member and is provided with a pivot tube 18T arranged substantially centrally thereof and secured between the arms of the U-shaped member, as illustrated in FIG. 4, for example. The pivot tube 18T is coaxially arranged with a pair of pivot pin apertures 18F and 18R so as to receive the pivot pin 20 therein. When the bottom plate means 18 is arranged in complementary fashion with regard to the top plate means 16, as illustrated in the drawings, i.e., one plate interfitted inside the other, the pivot pin 20 may be utilized to pivotally secure the plates 16 and 18 together. The pivot pin 20 is illustrated in the form of a conventional fastener which is secured to the plates 16 and 18 by means of the apertures 16F, 18F, the pivot tube 18T, and the rear apertures 16R and 18R. The pivot pin 20 is shown as a conventional fastener having a head 20H on the outside of the platform means P and secured by means of a nut 20N to the inside of the platform means. This arrangement, then, pivotally secures the plates 16, 18 together and in pivotal relationship to the frame F. The caster assemblies 12 and 14 are spaced adjacent each end of the bottom plate means 18 and secured thereto by the fasteners 12F and 14F to depend from the bottom of the plate means 18, as illustrated in FIGS. 2 and 3, for example.

It should now be recognized that the prior problems of "three-wheel" carts due to misalignments or the like have been eliminated since the caster assemblies 12 and 14 of the present invention will pivot about the pin 20 in response to any misalignment or traveling over irregular surface. Such a pivotable relationship is illustrated in FIG. 3 to indicate that the wheels of the caster assemblies 12 and 14 are continuously in engagement with the supporting surface. In FIG. 3 the caster assembly 12 is illustrated pivoted downwardly from the pivot pin 20 to maintain the same vertical height as the caster assembly 14 on the opposite side of pin 20 and thereby all four wheels are substantially in continuous engagement with the supporting surface. A correct vertical alignment for the caster assemblies 12 and 14 is illustrated in FIG. 2.

What is claimed is:

1. A shopping cart comprising a frame, an upwardly opening basket secured to the frame, individual caster assemblies separately secured to the frame adjacent the rear corners thereof for supporting the rear end of the frame on a supporting surface, and platform means secured adjacent the front end of the frame, a pair of caster assemblies secured to the platform means in a spaced relationship for supporting the front end of the frame on a supporting surface, said platform means being attached to the front of the frame by a pivot means, said pivot means being constructed and defined for permitting each of the front caster assemblies to be pivotably responsive relative to the other front caster assembly when placed on a supporting surface to thereby be pivotably responsive to any difference in vertical heights of the caster assemblies to pivot the elevated caster assembly downwardly for maintaining substantially the same vertical height as the caster assembly on the opposite side of the platform means to cause both front caster assemblies to substantially continuously engage any type of supporting surface when advanced thereon whereby the pivoting action of the platform means prevents any tendency of the frame to be supported by only one of the front caster assemblies is substantially eliminated.

2. A shopping cart as defined in claim 1 wherein said platform means comprises, a first substantially U-shaped plate means secured adjacent to the front end of the frame, a second substantially U-shaped plate means mounted in a complementary relationship with the first plate means, and said pivot means secured substantially centrally of the thus arranged plate means to permit the second plate means to pivot about the pivot means and thereby pivot relative to the frame, and said pair of caster assemblies rotatably secured adjacent each end of the second plate means to be pivotable therewith.

3. A shopping cart as defined in claim 2 wherein said first plate means is a U-shaped plate secured with the open end of the U facing the supporting surface and having an aperture in each arm of the U arranged coaxially, said second plate means is a U-shaped plate arranged with the open end of the U facing the first plate means, said second plate having a tube secured substantially centrally thereof between the arms of the U, each arm of the U-shaped second plate having an aperture coaxial with the tube and coaxial with the aperture of the first mentioned plate when the plates are assembled in a complementary fashion and said pivot means comprises a pivot pin extending through the apertures of the plates and through the tube and secured in position to permit the second plate means to pivot about same.

4. A shopping cart as defined in claim 2 wherein said second plate means is received within the first plate means.

5. A shopping cart comprising a frame, an upwardly opening basket secured to the frame, individual caster assemblies separately secured to the frame adjacent the rear corners thereof for supporting the rear end of the frame on a supporting surface, and a first plate means secured adjacent the front end of the frame, and second plate means pivotally mounted to and below the first plate means by a pivot means and a pair of caster assemblies secured in a spaced relationship to said second plate means whereby the pivoting action of the second plate means in response to any difference of heights of the pair of caster assemblies with respect to the supporting surface permits substantially continuous engagement of said pair of caster assemblies with any type of a supporting surface for the shopping cart whereby upon encountering an irregular surface tending to space one of the caster assemblies above the supporting surface the automatic pivoting action of the second plate means eliminates any tendency for the shopping cart to be supported on a surface by means of only one of the front caster assemblies when advanced thereover.

6. A shopping cart as defined in claim 5 wherein said first and second plate means are U-shaped with the legs of the U comprising arms wherein said second plate means is interfitted within the arms of the first plate means, and is pivoted by means of said pivot pin means secured through the arms of each plate means.

* * * * *